United States Patent
Makarov

(10) Patent No.: US 9,405,652 B2
(45) Date of Patent: Aug. 2, 2016

(54) REGULAR EXPRESSION SUPPORT IN INSTRUMENTATION LANGUAGES USING KERNEL-MODE EXECUTABLE CODE

(71) Applicant: Red Hat, Inc., Raleigh, NC (US)

(72) Inventor: Serguei Makarov, Toronto (CA)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 14/068,487

(22) Filed: Oct. 31, 2013

(65) Prior Publication Data

US 2015/0121337 A1    Apr. 30, 2015

(51) Int. Cl.
G06F 11/34 (2006.01)
G06F 9/44 (2006.01)

(52) U.S. Cl.
CPC ............ *G06F 11/34* (2013.01); *G06F 9/444* (2013.01)

(58) Field of Classification Search
None
See application file for complete search history.

(56) References Cited

U.S. PATENT DOCUMENTS

| | | | |
|---|---|---|---|
| 5,768,564 A * | 6/1998 | Andrews et al. | 717/137 |
| 6,684,381 B1 | 1/2004 | Bening et al. | |
| 7,496,892 B2 | 2/2009 | Nuss | |
| 7,512,634 B2 * | 3/2009 | McMillen | |
| 7,653,633 B2 | 1/2010 | Villella et al. | |
| 8,272,048 B2 * | 9/2012 | Cooper et al. | 726/17 |
| 8,332,828 B2 * | 12/2012 | Vargas | 717/137 |
| 8,386,530 B2 * | 2/2013 | McMillen | 707/802 |
| 8,413,124 B2 * | 4/2013 | Wang | 717/143 |
| 8,726,253 B2 * | 5/2014 | Glendenning et al. | 717/151 |
| 8,739,135 B2 * | 5/2014 | Eigler | 717/130 |
| 2006/0265357 A1 * | 11/2006 | Potts | 707/3 |
| 2007/0006188 A1 * | 1/2007 | Schroth et al. | 717/140 |
| 2007/0103175 A1 * | 5/2007 | Eigler | G06F 11/3466 717/158 |
| 2007/0107058 A1 * | 5/2007 | Schuba et al. | 726/23 |
| 2009/0254889 A1 * | 10/2009 | Prasadarao | G06F 11/3644 717/130 |
| 2010/0325607 A1 * | 12/2010 | Meijer et al. | 717/106 |
| 2011/0060946 A1 * | 3/2011 | Gupta et al. | 714/26 |
| 2011/0113048 A1 * | 5/2011 | Njemanze | 707/755 |
| 2012/0005184 A1 | 1/2012 | Thilagar et al. | |

FOREIGN PATENT DOCUMENTS

| | | |
|---|---|---|
| KR | 20130002365 | 1/2013 |
| WO | WO-2010018710 | 2/2010 |

OTHER PUBLICATIONS

Computer scripting language. 2014. Encyclopdia Britannica Online. Retrieved Oct. 31, 2014, from http://www.britannica.com/EBchecked/topic/1086439/computer-scripting-language.*

(Continued)

*Primary Examiner* — Chat Do
*Assistant Examiner* — Douglas Slachta
(74) *Attorney, Agent, or Firm* — Haynes and Boone, LLP

(57) ABSTRACT

Systems and methods are provided for regular expression support in instrumentation languages using kernel-mode executable code. An example system includes a translator module that receives an input source code including a regular expression in a first source code language, wherein the translator module further determines a matching function in kernel-mode code language corresponding to the regular expression, and wherein the matching function corresponds to deterministic finite automaton. The system further includes a kernel module that processes at least one string using the matching function, wherein the matching function simulates state transitions of the deterministic finite automaton using the at least one string.

10 Claims, 4 Drawing Sheets

(56) References Cited

OTHER PUBLICATIONS

Jacob, B., Larson, P., Lelto, B., & da Silva, S. (2009). SystemTap: Instrumenting the Linux Kernel for Analyzing Performance and Functional Problems (1st ed.). IBM.* http://onlinelibrary.wiley.com/doi/10.1002/spe.841/abstract, Vassillos Karakoidas, Diomidis Spinellis, Fire/J—Optimizing Regular Expression Searches with Generative Programming, Athens University of Economics and Business, Patission Ave 74 GR-10434, Athens, Greece, Jul. 23, 2007, 2 pp.

http://www.sciencedirect.com/science/article/pii/S0010465510000986, T. Reiter, Optimising Code Generation with Haggies, Nikhef, Science Park 105, 1098 XG Amsterdam, The Netherlands, Jul. 2010, 4 pp.

http://www.perlmonks.org/?node_id=910116, Precompiling Substitution Regex, PerlMonks.org, 2011, 3 pp.

http://stackoverflow.com/questions/952998/is-there-a-way-to-precompile-a-regex-in-perl, is there a way to precompile a regex in Perl?, StackOverflow.com, 2009, 2 pp.

* cited by examiner

REGULAR EXPRESSION SUPPORT IN INSTRUMENTATION LANGUAGES USING KERNEL-MODE EXECUTABLE CODE

FIELD OF DISCLOSURE

The present disclosure generally relates to a computer system and more particularly to adding regular expression support in an instrumentation language using kernel-mode executable code.

BACKGROUND

In computing, regular expressions can provide a search language enabling a user to process strings to find patterns. Regular expressions, or regex, provide a syntax that allows a user to input a pattern and pattern rules for programmatically generating a pattern in order to perform pattern matching, such as find and find/replace functions. Generally, regular expressions in a programming language may be implemented in one of two ways. A regular expression may be compiled to a data structure corresponding to a state machine having state transitions that represent the regular expression. When a script including the regular expression runs, an interpretation algorithm in a system's user mode is invoked on the data structure to perform string matching. The second implementation of regular expressions includes using a language preprocessor to replace the regular expression in the script with source code in the script. The source code then hard codes state transitions for a state machine using the programming languages control structures.

SystemTap offers infrastructure to access a range of diagnostic facilities for a system, including kernel-internal diagnostic tools. SystemTap implements a system-wide instrumentation language, which provides a scripting language to obtain data about processes and events occurring on the system. This allows a user to troubleshoot and perform analysis of the system. SystemTap includes a loader program and a runtime environment having runtime libraries. The loader program receives a script from a user that contains probes of the systems functions. The probes contain events and handlers, where the event names some activity on the system and the handler describes steps to be done when the event occurs. Once the script is received, it is translated into C. Tapsets may be used to define prewritten probes that are replaced when the script is translated. The C code is then compiled into a kernel module and loaded to the kernel.

SystemTap runtime environment consists of a set of runtime libraries linked to the compiled C code and are used to implement basic operations to access the system. The results of handlers contained in the compiled C code are displayed in the output of the script. The SystemTap script may be invoked from the SystemTap loader program from a command line. Thus, users are given a tool to diagnose system behavior during named events.

BRIEF SUMMARY

This disclosure relates to web application systems and methods for regular expression and kernel modules. Methods, systems, and techniques for regular expression support in an instrumentation language using kernel-mode executable code are provided.

According to an embodiment, a system for providing regular expression support using kernel-mode code language matching functions includes a translator module that receives an input source code including a regular expression in a first source code language. The translator module further determines a matching function in kernel-mode code language corresponding to the regular expression, and wherein the matching function corresponds to deterministic finite automaton. The system also includes a kernel module that processes at least one string using the matching function, wherein the matching function simulates state transitions of the deterministic finite automaton using the at least one string.

According to another embodiment, a method for providing regular expression support using kernel-mode code language matching functions includes receiving an input source code including a regular expression in a first source code language. The method further includes determining, using one or more hardware processors, a matching function in kernel-mode code language corresponding to the regular expression, wherein the matching function corresponds to deterministic finite automaton, and processing at least one string using the matching function, wherein the matching function simulates state transitions of the deterministic finite automaton using the at least one string.

According to another embodiment, a non-transitory computer readable medium comprising a plurality of machine-readable instructions which when executed by one or more processors of a server are adapted to cause the server to perform a method including receiving an input source code including a regular expression in a first source code language, wherein the regular expression is a literal value in the input source code, and wherein the regular expression corresponds to regular expression matching instructions. The method also includes translating the input source code into a second source code language, compiling the second source code language to a kernel module, and determining a matching function in kernel-mode code language corresponding to the regular expression, wherein the matching function corresponds to deterministic finite automaton. The method further includes processing at least one string using the matching function, wherein the matching function simulates state transitions of the deterministic finite automaton using the at least one string, and wherein regular expression matching instruction is translated to an invocation to the matching function in kernel-mode code language.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
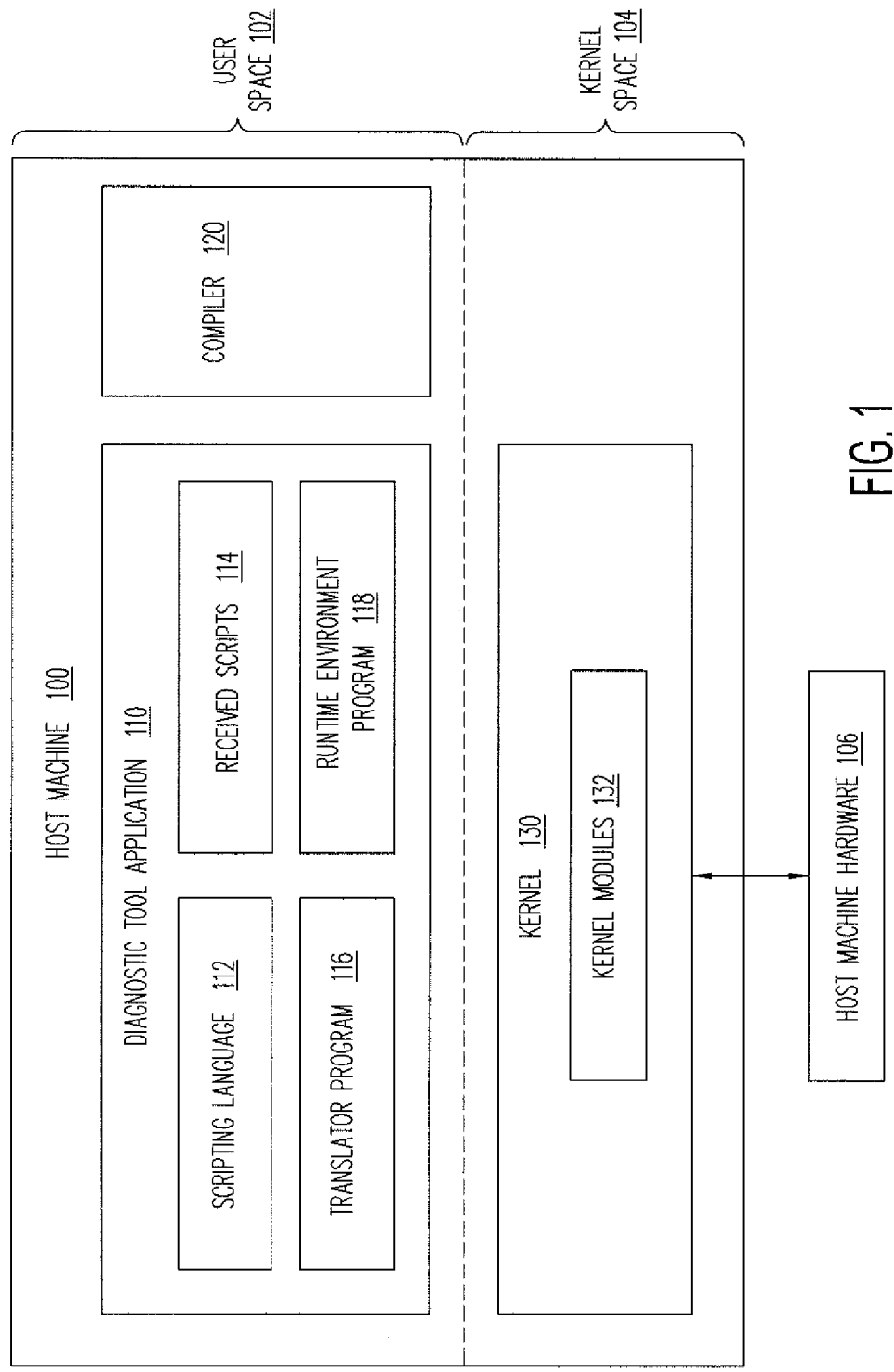
FIG. 1 illustrates a host machine utilizing an instrumentation language with regular expression support using kernel-mode executable code, according to an embodiment.

FIG. 1 illustrates an host machine utilizing an instrumentation language with regular expression support using kernel-mode executable code, according to an embodiment. Terms like "machine," "device," "computer," and "computing system" are used interchangeably and synonymously throughout this document. System 100 may include a server computing system and/or a client computing system.

FIG. 1 includes a host machine 100 having user space 102, kernel space 104, and host machine hardware 106. Host machine 100 may include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of host machine 100. Host machine 100 may be implemented using any appropriate hardware and software. Host machine 100 may be implemented as a personal computer (PC), a smart phone, personal digital assistant (PDA), laptop computer, wristwatch with appropriate computer hardware resources (e.g., SAMSUNG GALAXY GEAR®), eyeglasses with appropriate computer hardware (e.g. GOOGLE GLASS®) and/or other types of computing devices capable of transmitting and/or receiving data, such as an IPAD® from APPLE®. Although only one host machine is shown, a plurality of user devices may be utilized. Exemplary host machine operating system (OS) may include a MICROSOFT® OS, a UNIX® OS, a LINUX® OS, or other suitable device and/or server based OS.

Host machine hardware 106 may correspond to appropriate hardware necessary for the implementation of various processes of host machine 100. Host machine hardware 106 may include, but is not limited to, hard-drives, disk-drives, random access memory (RAM), read-only memory (ROM) or other static memory, central processing unit, such as one or more hardware processors, or other hardware. Host machine hardware 106 may be utilized to implement user space 102 and kernel space 104.

User space 102 corresponds generally to a portion of the memory allocated to running application software. Thus, user space 102 describes a portion of the virtual memory where user space processes run. User space processes correspond generally to instances of user applications executing in user space 102. Generally, user space processes are copied from a storage unit of host system 100, such as a hard-drive, disk-drive, or other non-transitory computer readable memory/medium, to RAM, or other high access speed volatile memory. Once copied into host system 100's RAM, an instance of the application may execute in user space 102.

Kernel space 104 corresponds to a part of an operating system of host system 100 loaded into the memory (i.e. RAM of host system 100) at start-up of host system 100. Kernel space 104 forms a portion of the operating system that interacts between user space 102 and host system hardware 106. Kernel space 104 normally is loaded to a protected area of the memory, and may be accessed by user space processes through system calls. System calls correspond to requests by user space processes to a kernel executing in kernel space 104. A kernel, such as kernel 130, may utilize components of host machine hardware 106. In other embodiments, system calls may correspond to request to use other services provided kernel 130 in the kernel space 104. Kernel 130 is discussed in more detail below.

User space 102 includes diagnostic tool application 110 having scripting language 112, received scripts 114, translator program 116, and runtime environment program 118. Diagnostic tool application 110 and compiler 120 may correspond to applications and/or processes executing in user space 102 as previously discussed. Thus, diagnostic tool application 110 and compiler 120 may correspond to instances of applications loaded from static memory and executing in user space 102. Scripting language 112, as used here, corresponds to a language that is translated to C code using an intermediary translator, where the C code is compiled to a kernel module. This is in contrast to other scripting language, which may only correspond to environment specific languages to interpret a script for various system tasks rather than compiled like a programming language.

Diagnostic tool application 110 may correspond to a diagnostic tool for system processes, such as SystemTap. Diagnostic tool application 110 may implement a instrumentation language, which includes a scripting language and processes to gather information occurring through a system, such as host machine 100. Thus, diagnostic tool application 110 includes scripting language 112, which corresponds generally to a programming language for writing scripts. In this regard, scripting language 112 includes programming tools for writing scripts for a special runtime environment that may execute the tasks programmed in the script. Scripting language 112 further includes constructs and syntax elements necessary for creating source code. Scripting language 112 may further include support for regular expression, as will be discussed in more detail herein with respect to translator program 116.

Diagnostic tool application 110 further includes received scripts 114. Received scripts 114 correspond generally to scripts stored with diagnostic tool application 110 usable to implement a process pr processes of diagnostic tool application 110. Thus, diagnostic tool application 110 may include probe scripts, which may correspond generally to a process to probe a system point/process. A probe script identifies an event that may occur throughout the system. When the event occurs, handlers are assigned to the event to execute as a subroutine. Thus, received scripts 114 may include instruction to collect information of a system event, and then execute a process when the information is collected.

Received scripts 114 may include, in various implementations, a tapset and/or tapset library which correspond generally to defined scripts available for reuse. Tapsets may correspond to probe scripts received by an administrator and/or creator of diagnostic tool application 110. In other embodiments, tapsets may be defined by a user. Tapsets may be referenced in other scripts and execute a probe script based on the stored probe and function of the tapset. Tapset libraries provide an abstraction layer making it easier for a writer of received scripts 114 to define events.

Diagnostic tool application 110 includes translator program 116. Translator program 116 correspond to a process executable by diagnostic tool application 110 to translate received scripts 114 from scripting language 112 to a lower level code language for compiling into a kernel module. Translator program includes libraries usable to translate source code written in scripting language 112 into a lower level code, such as C. Thus, source code constructs given in scripting language 112 are converted to source code constructs in the lower level code language, for example, C. Source code constructs in the lower level code language are translated using kernel-mode code language constructs. Thus, the source code in scripting language 112 can be translated to source code in a programming language (e.g. C) that can then be compiled.

Additionally, translator program 116 may identify regular expressions and produce a deterministic finite automaton corresponding to the regular expression. A regular expression corresponds to a set of pattern matching rules for a string or strings. Thus, a regular expression may receive input characters and corresponding matching instructions to the input. The matching instructions may define the patterns with the input characters used for matching, as well as the data with which to perform the matching. Once patterns have been defined, the data is processed to find matches to the patterns by processing input strings based on the matching instructions. Regular expressions may provide functions, such as find, find and replace, or other functions, based on the matching instructions.

Regular expressions in received scripts 114 may not normally be translated to a lower level code language. Thus, when source code in received scripts 114 includes a regular expression, translator program 116 may produce a deterministic finite automaton (DFA). A DFA is a finite state machine that accepts and/or rejects strings of symbols to produce a computation on the string. Thus, a pattern given in regular expression can be expressed as a DFA by capturing the pattern as state transitions of the pattern. For example, a pattern may correspond to binary code 10, where the first state transition corresponds to a 1 to advance to state 1, and a 0 to return to state 0, the accept state. Other DFA may include additional states, state transitions, input symbols, and/or accept states. Other patterns may correspond to the regular expression in the script, including letters, numbers, characters, and/or other symbols.

The source code including the regular expression(s) may include regular expression matching instruction(s). The regular expression(s) in a script may be expressed only as a literal in the source code, thus they may not be programmatically generated using string operations. To this effect, a regular expression expressed only as a literal represents a fixed value in the source code. Therefore, all regular expressions used in the script are known at the time of translation and patterns to generate DFA's are known.

After translator program 116 produces a deterministic finite automaton based on the regular expression, translator program 116 may emit the deterministic finite automaton as matching function in kernel-mode code language. The matching function may take as input a string and simulate the state transitions of the DFA on the input string (or other input data). If the matching function simulating the DFA arrives on an accept state of the DFA, a match to the regular expression may be found in the string.

Regular expression matching instructions in the source code may be translated to an invocation to the matching function in kernel-mode code language. To this effect, the regular expression matching instructions may serve as a process to execute the matching function using at least one input string. The regular expression matching instruction may determine the at least one input string used and/or execution of the matching instruction.

Diagnostic tool application 110 includes a runtime environment program 118, which may correspond generally to a process to test and view executed received scripts 114 after they have been compiled and are executing in a kernel module. Thus, runtime environment program 118 provides a runtime environment for the respective formats of diagnostic tool application 110. Runtime environment program 118 implements the behavior of received scripts 114 and allows a user of diagnostic tool application 110 to view and analyze the resulting information.

User space 102 includes compiler 120, which may be separate from or incorporated within diagnostic tool application 110. Compiler 120 corresponds generally to a process to translate or "compile" source code written in a programming language (i.e. a lower level code language as previously discussed, such as C) to another target language, for example, kernel-mode code language. Kernel-mode code language may correspond to object code and/or machine mode code (e.g. binary). Compiler 120 can further produce kernel modules, such as kernel module 132, for execution in kernel 130 of host machine 100.

As previously discussed, kernel space 104 corresponds generally to a portion of the memory allocated to execution of the kernel and kernel processes, which may allow system calls from user space 102 to kernel space 104. Kernel space 104 include kernel 130 having kernel modules 132. Kernel 130 may correspond to a program that interacts with user space 102 and host machine hardware 106. Kernel 130 may provide services to parts of the operating system in user space 102, including memory, process, and file management and/or other system management functions. Services of kernel 130 may be requested through system calls. System calls may include services, such as execution of a process on a hardware processor (scheduling) and/or other services required by applications in user space 102.

Kernel may also include kernel modules 132, which may correspond to modules loaded into the kernel in kernel-mode code language. Such modules may extend kernel 130 by offering additional services for kernel 130. Kernel modules 132 may include loadable modules that may be unloaded after execution. In this regard, received scripts 114 that are translated and compiled to kernel modules along with matching functions in kernel-mode code language, may correspond to one or more of kernel modules 132.

The generated kernel-mode code module (kernel modules 132 generated by compiler 120 and translator programs 116), may be executed under constraints to prevent error. Thus, one or more of kernel modules 132 may be executed with no recursion, limited data and/or stack size, and limited execution time. Thus, error handling when executing one or more of kernel modules 132 may be strict to prevent issues of time and available memory. Thus, the executed one or more kernel modules 132 will not cause a system crash.

Figure 2:
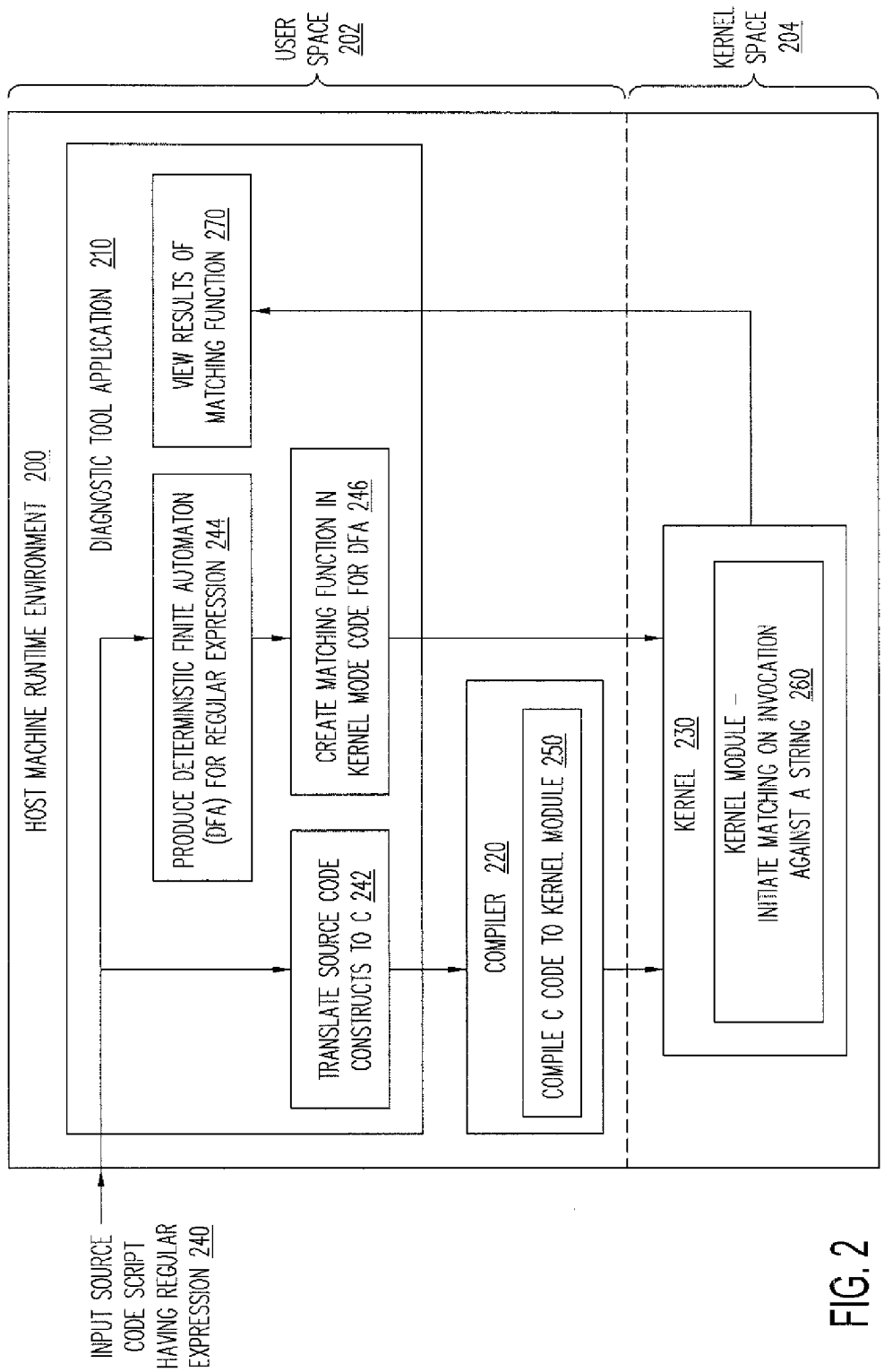
FIG. 2 is a simplified block diagram illustrating an exemplary flowchart for a diagnostic tool application using a translator program to provide regular expression support in an instrumentation language using kernel-mode executable code, according to an embodiment.

FIG. 2 is a simplified block diagram illustrating an exemplary flowchart for a diagnostic tool application using a translator program to provide regular expression support in an instrumentation language using kernel-mode executable code, according to an embodiment. Although the components of host machine runtime environment 200 are shown residing in one structure, it is understood each structure may be implemented and/or executed by a separate computer system or processor. For example, host machine runtime environment 200 may compile a kernel module for execution by a kernel of another computer system or processor.

An input source code script having regular expressions is entered into diagnostic tool application 210 at step 240. Host machine runtime environment 200 executes an instance of diagnostic tool application 210, which may correspond generally to diagnostic tool application 110 of FIG. 1. Thus, diagnostic tool application 210 may include processes, language constructs/syntax, and/or other data necessary to process input source code contained in step 240. Input source code having regular expression received at step 240 may come from a script written and submitted to diagnostic tool application 210 by a user. Additionally, the input source code script may include and/or utilize source code scripts stored with diagnostic tool application 210, for example, tapsets in a tapset library. The input source code script may be written in a first language, such as a scripting language. The scripting language may correspond to SystemTap in various embodiments.

Diagnostic tool application 210 then translates source code constructs in the first language (e.g. a scripting language such as SystemTap) to C at step 242. Source code constructs may correspond to basic elements, commands, and/or statements contained in the input source code. In this regard, the elements, commands, and/or statements may be syntactically correct parts of a script that are translated to a lower level code language, such as C. The source code constructs may be translated using only constructs available in kernel-mode code language. A translator program may perform the translation of the source code constructs.

At step 244, diagnostic tool application 210 may additionally produce a deterministic finite automaton (DFA) from regular expression contained in the input source code script received at step 240. A DFA corresponds to the regular expression by coding the state transitions for the DFA using the pattern defined by the regular expression. A regular expression in the input source code script may be given as a literal so that all regular expressions are known at the time of translation and are not produced by string operations. Thus, all patterns that may create a DFA are known at the time of creation of the DFA. Therefore, diagnostic tool application 210 utilizes only known regular expressions to create DFA's.

The DFA's produced by diagnostic tool application 210 are emitted as a matching function in kernel-mode code language at step 246. The matching function may take at least one string as input and perform the state transitions of the DFA on the input string(s). If the matching function ends on an accept state of the DFA when simulating the state transitions of the DFA, then the string or part of the string matches the regular expression. The matching function is emitted as kernel-mode code language and transmitted to kernel 230 in kernel space 204 for use in a kernel module created at step 250. Additionally, regular expression matching instructions for each regular expression may be translated to kernel-mode code language and transmitted to kernel 230 for use in the kernel module.

Thus, at step 250, the c code program created at step 242 is compiled using compiler 220 into a kernel module. Compiler 220 creates a kernel module in kernel-mode code language for implementation by kernel 230. Compiler 220 may compile the c code program into object mode/machine mode code language for the kernel module.

The kernel module with the matching function is loaded into kernel 230 for execution. Each regular expression in the source code further has regular expression matching instructions. Regular expression matching instructions translated from the source code may serve as an invocation to the matching function to process at least one string using the matching function. Thus, regular expression matching instructions may determine the at least one string to be processed, as well as any additional functions to perform on the at least one string. The regular expression matching instructions may determine the number of times the matching function is performed on a string and/or a stop point to the matching function (e.g. find a first matching string, etc.). Additionally, error handling of the kernel module may be strict, as previously discussed. Thus, the kernel module may be executed with no recursion, limited data/stack size, and limited execution time to prevent system crashes.

At step 270, results of the matching function are viewed, for example, in a runtime environment. The runtime environment may display matching strings from the at least one string based on the regular expression matching instructions. Additionally, runtime environment may display additional functions contained in the regular expression matching instructions, such as replace function.

Figure 3:
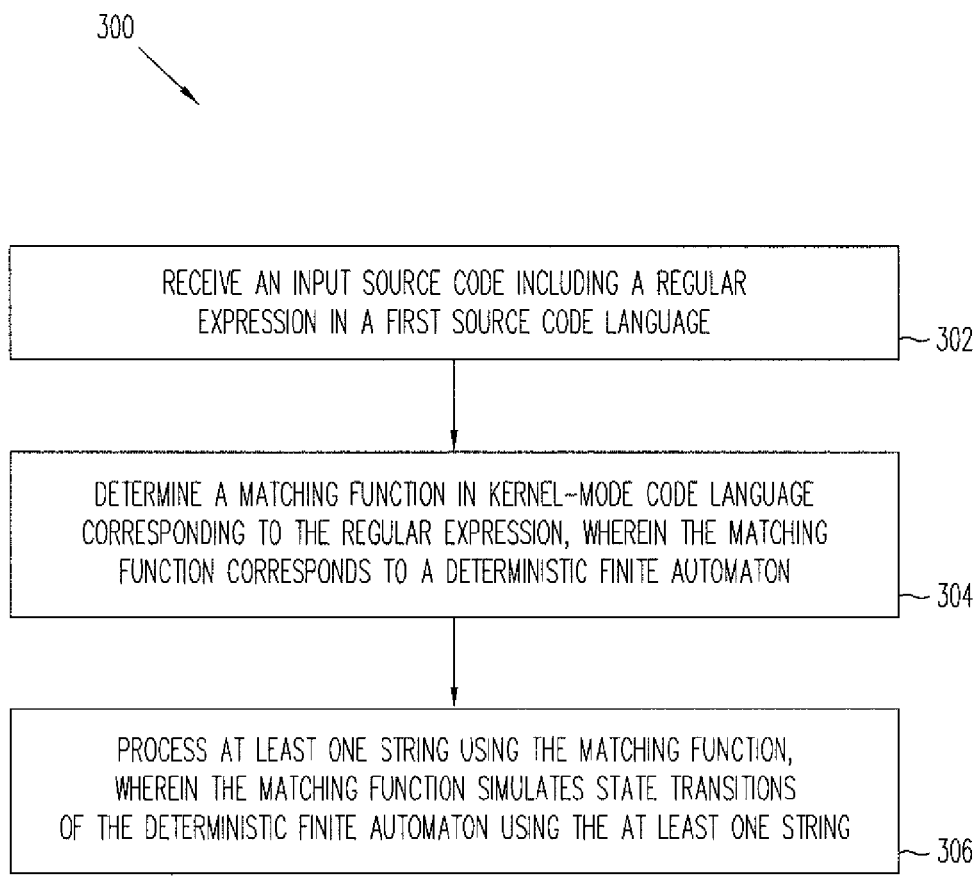
FIG. 3 is a simplified block diagram illustrating an exemplary method for providing regular expression support in an instrumentation language using kernel-mode executable code, according to an embodiment.

FIG. 3 is a simplified block diagram illustrating an exemplary method for providing regular expression support in an instrumentation language using kernel-mode executable code, according to an embodiment. Note that one or more steps, processes, and methods described herein may be omitted, performed in a different sequence, or combined as desired or appropriate.

An input source code including a regular expression in a first source code language is received, for example, by host machine 100, at step 302. Input source code may include a script written in the first source code language, such as a scripting language including SystemTap. The input source code may include input source code constructs written in the first source code language as well as regular expressions. A diagnostic tool application may receive the input source code and utilize the input source code to create a kernel module including kernel-mode code language matching instructions as discussed below.

At step 304, a matching function in kernel-mode code language corresponding to the regular expression is determined, wherein the matching function corresponds to a deterministic finite automaton. The regular expression may be described as a deterministic finite automaton, where the state transitions are coded to the characters and/or pattern of the regular expression. The regular expression may be given as a literal value, so all regular expressions are known at the time of translating an input source code. Thus, no string operations need to be performed on the regular expression, and a deterministic finite automaton may be produced from the literal value of the regular expression.

The deterministic finite automaton is then emitted as a matching function in kernel-mode code language for use in a kernel module formed from the input source code. The input source code may be translated to a second source code language, for example C. The input source code may be translated using only kernel-mode code language constructs, so the resulting C language program may be compiled into the kernel module. Once the kernel module is created, the kernel module with the matching function is loaded into a host machine's kernel.

The regular expression further includes regular expression matching instructions, including find, find and replace, find with conditions, or other matching instructions. Thus, the regular expression matching instructions may be translated into kernel-mode code language as an invocation for the matching function. At step 306, at least one string is processed using the matching function, wherein the matching function simulates state transitions of the deterministic finite automaton using the at least one string. Results from processing the at least one string using the matching function may then be output in a diagnostic tool application's runtime environment.

Figure 4:
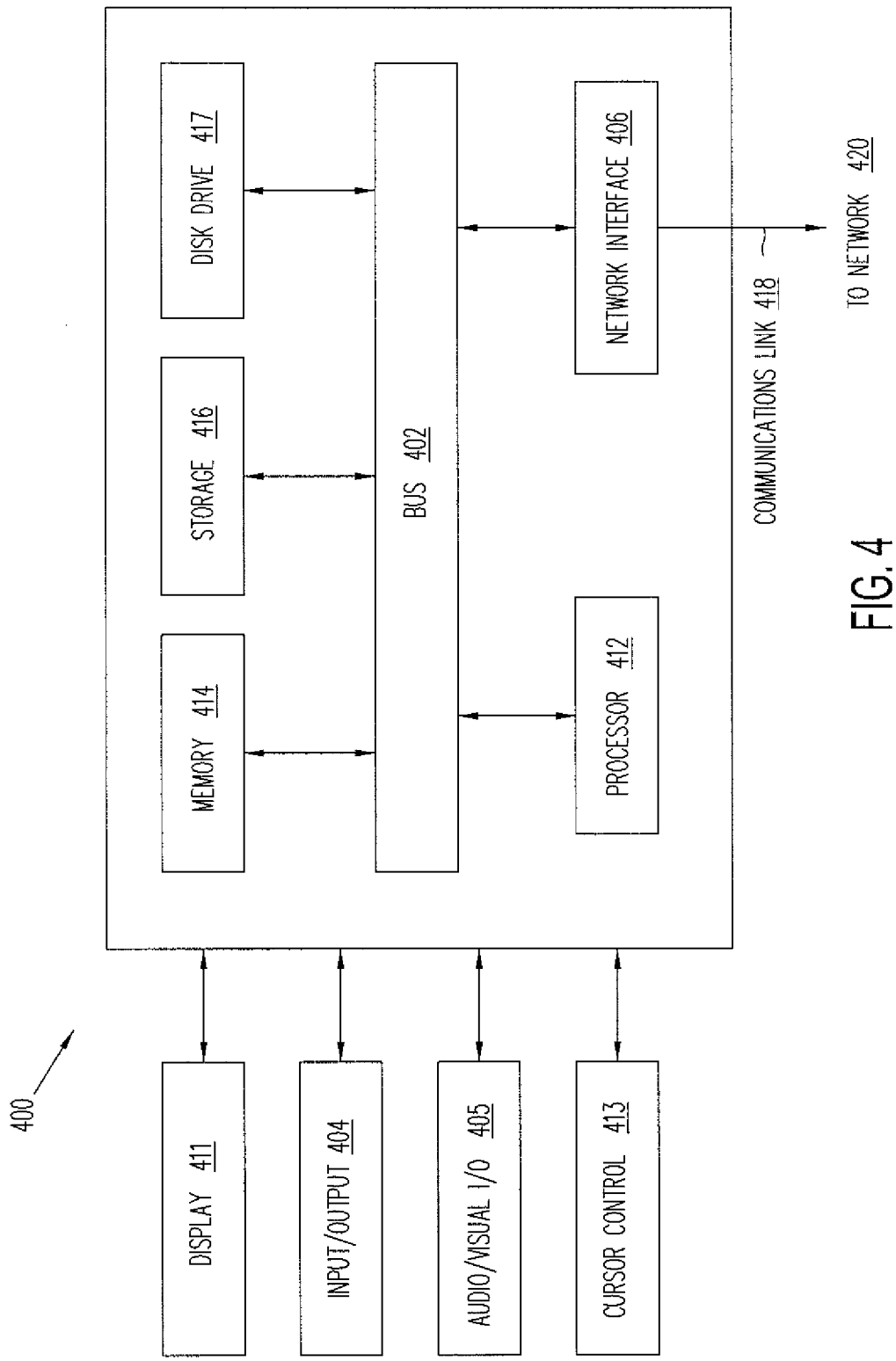
FIG. 4 is a block diagram of a computer system suitable for implementing one or more embodiments of the present disclosure.

FIG. 4 is a block diagram of a computer system 400 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another endpoint, a merchant server, or a service provider server via network 420.

Network 420 may be implemented as a single network or a combination of multiple networks. For example, in various embodiments, network 420 may include the Internet or one or more intranets, landline networks, wireless networks, and/or other appropriate types of networks. Thus, network 420 may correspond to small scale communication networks, such as a private or local area network, or a larger scale network, such as a wide area network or the Internet, accessible by computer system 400.

In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for providing regular expression support using kernel-mode code language matching functions, the system comprising:
    at least one hardware processor coupled to a non-transitory memory and configured to cause the system to execute:
        a translator module that receives a probe script comprising an input source code of an event occurring in a host machine operating system and compiles the probe script written in a scripting language comprising SystemTap, wherein the probe script includes a set of definitions assigned by a user to reference other probe scripts, wherein the probe script includes a regular expression in the scripting language, wherein the translator module further determines input characters of the regular expression and regular expression matching instructions from patterns of the input characters, wherein the regular expression matching instructions comprise at least one of an identification of at least one string to perform matching using the regular expression, a number of times to perform the matching using the regular expression, and a stop point of the matching using the regular expression, and wherein the probe script performs analysis of a system point or process, wherein the translator module further determines a matching function in kernel-mode code language corresponding to the regular expression using the input characters and the patterns and translates the regular expression matching instructions to an invocation to the matching function in kernel-mode code language, and wherein the matching function corresponds to a deterministic finite automaton; and a kernel module that processes at least one string using the matching function and the invocation for the regular expression matching instructions in kernel-mode when executing the compiled probe script with the set of definitions to execute the regular expression in the probe script when analyzing the system point or the process, wherein regular expression matching instruction is translated to an invocation to the matching function in kernel-mode code language, wherein the matching function simulates state transitions of the deterministic finite automaton using the at least one string and the regular expression matching instructions in the kernel-mode, and wherein the kernel module finds matching patterns in the at least one string using the deterministic finite automaton.

2. The system of claim 1, wherein the regular expression is a literal value in the input source code.

3. The system of claim 1, wherein the translator module compiles the probe script by translating the input source code into a second source code language, and compiling the second source code language to a kernel module.

4. The system of claim 3, wherein the second source code language is C.

5. A method for providing regular expression support using kernel-mode code language matching functions, the method comprising:

receiving a probe script comprising an input source code of an event occurring in a host machine operating system, wherein the probe script includes a regular expression in a scripting language comprising SystemTap determining input characters of the regular expression and regular expression matching instructions from patterns of the input characters, wherein the regular expression matching instructions comprise at least one of an identification of at least one string to perform matching using the regular expression, a number of times to perform the matching using the regular expression, and a stop point of the matching using the regular expression, and wherein the probe script performs analysis of a system point or process;

compiling the probe script written in the scripting language, wherein the probe script includes a set of definitions assigned by a user to reference other probe scripts;

determining, using one or more hardware processors, a matching function in kernel-mode code language corresponding to the regular expression using the input characters and the patterns, wherein the matching function corresponds to a deterministic finite automaton;

translating the regular expression matching instructions to an invocation to the matching function in kernel-mode code language; and processing the at least one string using the matching function and the invocation for the regular expression matching instructions in kernel-mode when executing the compiled probe script with the set of definitions to execute the regular expression in the probe script when analyzing the system point or the process, wherein the matching function simulates state transitions of the deterministic finite automaton using the at least one string and the regular expression matching instructions in the kernel-mode, and wherein the processing finds matching patterns in the at least one string using the deterministic finite automaton.

6. The method of claim 5, wherein the regular expression is a literal value in the input source code.

7. The method of claim 5, wherein prior to receiving a regular expression in a first source code, the compiling the probe script comprises:

translating the input source code into a second source code language; and compiling the second source code language to a kernel module.

8. The method of claim 7, wherein the second source code language is C.

9. A non-transitory computer readable medium comprising a plurality of machine-readable instructions which when executed by one or more processors of an application server are adapted to cause the application server to perform a method comprising:

receiving a probe script comprising an input source code of an event occurring in a host machine operating system, wherein the probe script includes a regular expression in a scripting language comprising SystemTap, wherein the regular expression is a literal value in the input source code;

determining input characters of the regular expression and regular expression matching instructions from patterns of the input characters, wherein the regular expression matching instructions comprise at least one of an identification of at least one string to perform matching using the regular expression, a number of times to perform the matching using the regular expression, and a stop point of the matching using the regular expression, and wherein the probe script performs analysis of a system point or process;

compiling the probe script written in the scripting language, wherein the probe script includes a set of definitions assigned by a user to reference other probe scripts; wherein the compiling comprises:

translating the input source code into a second source code language; and compiling the second source code language to a kernel module;

determining a matching function in kernel-mode code language corresponding to the regular expression using the input characters and the patterns, wherein the matching function corresponds to a deterministic finite automaton;

translating the regular expression matching instructions to an invocation to the matching function in kernel-mode code language; and processing the at least one string using the matching function and the invocation for the regular expression matching instructions in kernel-mode when executing the compiled probe script with the set of definitions to execute the regular expression in the probe script when analyzing the system point or the process, wherein the matching function simulates state transitions of the deterministic finite automaton using the at least one string and the regular expression matching instructions in the kernel-mode, and wherein the regular expression matching instruction is translated to an invocation to the matching function in kernel-mode code language, and wherein the processing finds matching patterns in the at least one string using the deterministic finite automaton.

10. The non-transitory computer readable medium of claim 9, wherein the second source code language is C.

* * * * *